(12) United States Patent
Deng et al.

(10) Patent No.: US 11,355,005 B2
(45) Date of Patent: Jun. 7, 2022

(54) AQUATIC ORGANISM TRACKING DEVICES, SYSTEMS AND ASSOCIATED METHODS

(71) Applicant: Battelle Memorial Institute, Richland, WA (US)

(72) Inventors: Z. Daniel Deng, Richland, WA (US); Huidong Li, Richland, WA (US); Jun Lu, Richland, WA (US); Jayson J. Martinez, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 16/930,846

(22) Filed: Jul. 16, 2020

(65) Prior Publication Data
US 2021/0027615 A1 Jan. 28, 2021

Related U.S. Application Data

(60) Provisional application No. 62/877,235, filed on Jul. 22, 2019.

(51) Int. Cl.
*G08C 17/02* (2006.01)
*A01K 11/00* (2006.01)

(52) U.S. Cl.
CPC ............ *G08C 17/02* (2013.01); *A01K 11/006* (2013.01); *G08C 2201/12* (2013.01)

(58) Field of Classification Search
CPC ... G08C 17/02; G08C 2201/12; A01K 11/006
See application file for complete search history.

(56) References Cited

U.S. PATENT DOCUMENTS

| | | | | |
|---|---|---|---|---|
| 3,713,086 A | * | 1/1973 | Trott | B06B 1/0655 367/159 |
| 4,455,610 A | * | 6/1984 | Rodrian | A01K 11/006 377/6 |

(Continued)

OTHER PUBLICATIONS

Deng et al., U.S. Appl. No. 17/189,095, filed Mar. 1, 2021, titled "Organism Monitoring Devices and Organism Monitoring Methods", 52 pages.

(Continued)

*Primary Examiner* — Adnan Aziz
(74) *Attorney, Agent, or Firm* — Wells St. John P.S.

(57) ABSTRACT

Aquatic organism tracking devices, systems and associated methods are described. According to one aspect, an aquatic organism tracking device includes a housing, a transducer coupled with the housing and configured to transmit a data transmission externally of the housing and an aquatic organism associated with the tracking device, a programmable oscillator coupled with the housing, and wherein the programmable oscillator is configured to generate a clock signal having a selected one of a plurality of different frequencies, processing circuitry coupled with the housing and configured to receive the clock signal from the programmable oscillator and to execute a plurality of executable instructions according to the clock signal, a power source coupled with the housing and configured to store electrical energy, and wherein the processing circuitry is configured to control the provision of the electrical energy from the power source to the transducer to generate the data transmission as a result of the execution of the instructions.

24 Claims, 5 Drawing Sheets

(56) References Cited

U.S. PATENT DOCUMENTS

| | | | | |
|---|---|---|---|---|
| 5,168,473 | A * | 12/1992 | Parra | G01S 3/802 367/118 |
| 6,867,693 | B1 * | 3/2005 | Radin | G01S 5/14 340/539.1 |
| 7,453,762 | B1 * | 11/2008 | Lin | H03L 7/00 367/13 |
| 10,033,469 | B2 | 7/2018 | Deng et al. | |
| 10,033,470 | B2 * | 7/2018 | Deng | A01K 61/90 |
| 10,067,112 | B2 | 9/2018 | Deng et al. | |
| 10,101,429 | B2 | 10/2018 | Deng et al. | |
| 10,236,920 | B2 | 3/2019 | Deng et al. | |
| 10,531,639 | B2 | 1/2020 | Deng et al. | |
| 10,739,434 | B2 | 8/2020 | Deng et al. | |
| 10,935,536 | B2 | 3/2021 | Deng et al. | |
| 11,139,840 | B2 | 10/2021 | Deng et al. | |
| 2005/0102560 | A1 * | 5/2005 | Taketoshi | G06F 9/30181 714/14 |
| 2009/0063822 | A1 * | 3/2009 | Yasufuku | G06F 9/3802 712/208 |
| 2011/0235459 | A1 * | 9/2011 | Ware | G06F 3/0673 365/233.11 |
| 2012/0134239 | A1 * | 5/2012 | Struthers | H04B 1/034 367/137 |
| 2015/0063072 | A1 * | 3/2015 | Deng | B06B 1/0655 367/134 |
| 2015/0289479 | A1 * | 10/2015 | Allen | G01S 5/18 367/135 |
| 2016/0211924 | A1 * | 7/2016 | Deng | G01S 1/725 |
| 2016/0245894 | A1 | 8/2016 | Deng et al. | |
| 2017/0089878 | A1 | 3/2017 | Deng et al. | |
| 2017/0090536 | A1 * | 3/2017 | Schreiner | G06F 1/08 |
| 2017/0164581 | A1 | 6/2017 | Deng et al. | |
| 2017/0170850 | A1 * | 6/2017 | Deng | A01K 11/008 |
| 2018/0055007 | A1 | 3/2018 | Deng et al. | |
| 2019/0018100 | A1 | 1/2019 | Deng et al. | |
| 2019/0056372 | A1 | 2/2019 | Deng et al. | |
| 2019/0103888 | A1 | 4/2019 | Deng et al. | |
| 2020/0137980 | A1 | 5/2020 | Deng et al. | |
| 2020/0296854 | A1 | 9/2020 | Deng et al. | |
| 2020/0380326 | A1 * | 12/2020 | Kawaguchi | G06K 19/0709 |
| 2021/0148881 | A1 | 5/2021 | Deng et al. | |
| 2021/0190753 | A1 | 6/2021 | Deng et al. | |
| 2021/0194513 | A1 | 6/2021 | Deng et al. | |

OTHER PUBLICATIONS

Deng et al., U.S. Appl. No. 17/322,287, filed May 17, 2021, titled "Organism Monitoring Devices and Organism Monitoring Methods", 43 pages.

Deng et al., U.S. Appl. No. 17/486,800, filed Sep. 27, 2021, titled "Transmitters for Animals and Methods for Transmitting from Animals", 55 pages.

Deng et al., U.S. Appl. No. 62/267,738, filed Dec. 15, 2015, titled "Transmitters for Animals and Methods for Transmitting from Animals", 42 pages.

Deng et al., U.S. Appl. No. 62/267,797, filed Dec. 15, 2015, titled "Signal Transmitter and Methods for Transmitting Signals from Animals", 34 pages.

Deng et al., U.S. Appl. No. 62/379,473, filed Aug. 25, 2016, titled "Microtransmitters and Associated Methods Including Use with Eels and Lampreys", 54 pages.

Deng et al., U.S. Appl. No. 62/877,235, filed Jul. 22, 2019, titled "A Miniaturized Long-Life Low-Frequency Acoustic Transmitter for Animal Tracking in Marine Environment", 12 pages.

Deng et al., U.S. Appl. No. 62/937,613, filed Nov. 19, 2019, titled "Lab-On-A-Fish", 82 pages.

Vemco, "V4 and V5 180 kHz Coded Transmitters", Coded Transmitters Datasheet (4977-09), 2016, United States, 3 pages.

* cited by examiner

AQUATIC ORGANISM TRACKING DEVICES, SYSTEMS AND ASSOCIATED METHODS

RELATED PATENT DATA

This application claims the benefit of U.S. Provisional Patent Application Ser. No. 62/877,235, filed Jul. 22, 2019, titled "Miniaturized Long-Life Low-Frequency Acoustic Transmitter for Animal Tracking in Marine Environment", the disclosure of which is incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

TECHNICAL FIELD

This disclosure relates to aquatic organism tracking devices, systems and associated methods.

BACKGROUND OF THE DISCLOSURE

Marine and Hydrokinetic (MHK) devices are early-stage energy technologies and their impacts to ocean life and environment are largely unknown. Key areas of concern for MHK energy deployments include acoustic output (e.g., masking echolocation sounds or damaging hearing of some marine animals), Electric and Magnetic field (EMF) emissions (e.g., affecting navigation, avoidance or attraction of certain species), physical interactions with marine species (e.g., collision with MHK components), and effects on habitats (e.g., changing benthic habitats and sediment transport). A significant challenge for deploying MHK technologies has been the siting and permitting of these projects due to the uncertainty of marine animals colliding with MHK devices. Accordingly, mitigating the environmental risks and thus reducing deployment costs have been identified as a priority for MHK energy implementation.

However, the research with respect to MHK energy technology is still in its infancy, which is largely due to the limitations of the monitoring technologies available. Optical systems have been used to monitor marine animals' behavior at existing or potential MHK sites. However, the effectiveness of optical cameras is reduced in turbid or dark conditions. Active sonar devices usually have short ranges and can typically only provide 2D movement results. Moreover, these devices lack the ability to individually identify tracked organisms which makes them less useful in studying the long-term behavior of the organisms.

At least some aspects of the disclosure are directed towards aquatic organism tracking devices, systems and associated methods for tracking organisms in water.

BRIEF DESCRIPTION OF THE DRAWINGS

Example embodiments of the disclosure are described below with reference to the following accompanying drawings.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

Some of the example embodiments disclosed herein are directed towards aquatic organism monitoring systems including tracking devices that are associated with respective organisms to be tracked and monitored. More specific embodiments of the monitoring systems and tracking devices are utilized to provide tracking of marine organisms in the ocean using acoustic signals. In one example, the tracking devices may be associated with organisms to enable the study of the impacts and effects of MHK devices deployed within the seawater on the organisms, ocean life, environment and habitats.

The tracking devices may have associated unique identification (ID) codes to enable unique tracking of individual organisms. In one embodiment, the data transmission 18 transmitted from the tracking device 12 may contain binary (or derivative) data encoded with phase-shift keying (PSK). Binary data may contain header bits (e.g., a Barker code), a tag identification (ID) code, data collected from one or more sensors (e.g., temperature from a temperature sensor), error checking bits (e.g., a cyclic redundancy check (CRC)), or combinations of any or all of the above. The binary data within a single data transmission 18 comprises one tag code and the tracking device 12 may store one or more distinct tag codes in some embodiments.

According to some example embodiments described below, the tracking devices generate and emit periodic data transmissions 18 at a plurality of moments in time and including the unique ID codes from the tracking devices and monitored organisms that propagate through surrounding water and may be received by appropriate receiving systems to enable tracking or monitoring of the organisms as the organisms move throughout their natural aquatic environment.

Figure 1:
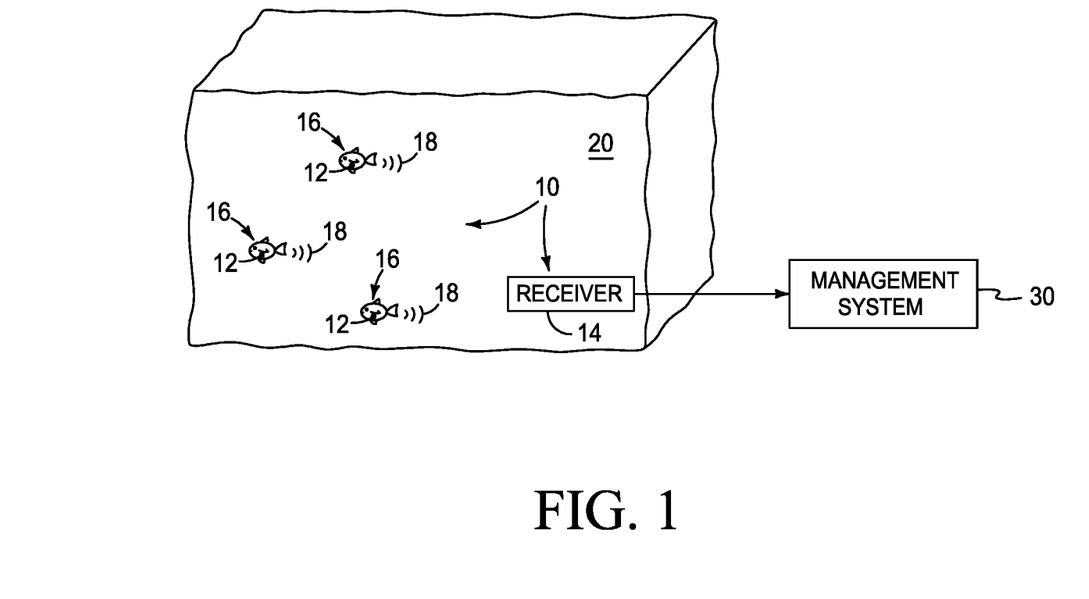
FIG. 1 is an illustrative representation of an aquatic organism monitoring system according to one embodiment.

Referring to FIG. 1, one example embodiment of an aquatic organism monitoring system 10 is shown. The illustrated system 10 includes a plurality of aquatic organism tracking devices 12 and a receiver 14 within a body of water 20 and a management system 30 that receives data transmissions from the tracking devices 12. As mentioned above, the aquatic organism monitoring system 10 may be used to monitor and track marine organisms within seawater of the ocean in some applications, for example, for use in monitoring effects of MHK systems in the ocean.

The tracking devices 12 are associated with a plurality of respective aquatic organisms 16 and the organisms having associated devices 12 may be referred to as tagged organisms. For example, a tracking device 12 may be embedded within the body of an individual aquatic organism 16 by surgery.

The tracking devices 12 are configured to generate and emit a plurality of data transmissions 18 externally of the organism 16 into water 20 of the environment and that may also be referred to as tracking signals. The data transmissions 18 are transmitted through the water 20 to one or more receivers 14 that are configured to receive the data transmissions 18. In some embodiments, the receiver 14 transmits the data within the received transmissions 18 to a management system 30 described below with respect to one example embodiment in FIG. 2. The system 10 may include a plurality of receivers 14 positioned at different locations within the body of water 20, for example adjacent to an installation of a MHK system in the ocean.

As mentioned above, the data transmissions 18 in some implementations include a unique code or identifier that may be used by a device receiving the transmissions 18 to uniquely identify the particular tracking device 12 (and particular organism 16 associated with the device 12) that emitted the data transmission 18. Accordingly, the locations of the individual tagged organisms 16 may be generally monitored using the identification codes and the locations of the receivers 14 that received the data transmissions 18 including the identification codes.

As an organism 16 moves throughout the aquatic environment, different receivers 14 at different locations may receive the data transmissions 18 emitted from the tracking device 12 that is associated with the organism 16. Data of the transmissions 18 may be processed to indicate the locations of the specific organism 16 at different moments in time. In one straightforward example, the organism 16 will be known to be in the vicinity of a particular receiver 14 which received the data transmissions 18 from the organism 16. In other examples, plural receivers 14 may receive the transmissions 18 and the data therein may be processed to provide location information of the organism 16 within the body of water 20 with increased accuracy or at different locations in the seawater.

Figure 2:
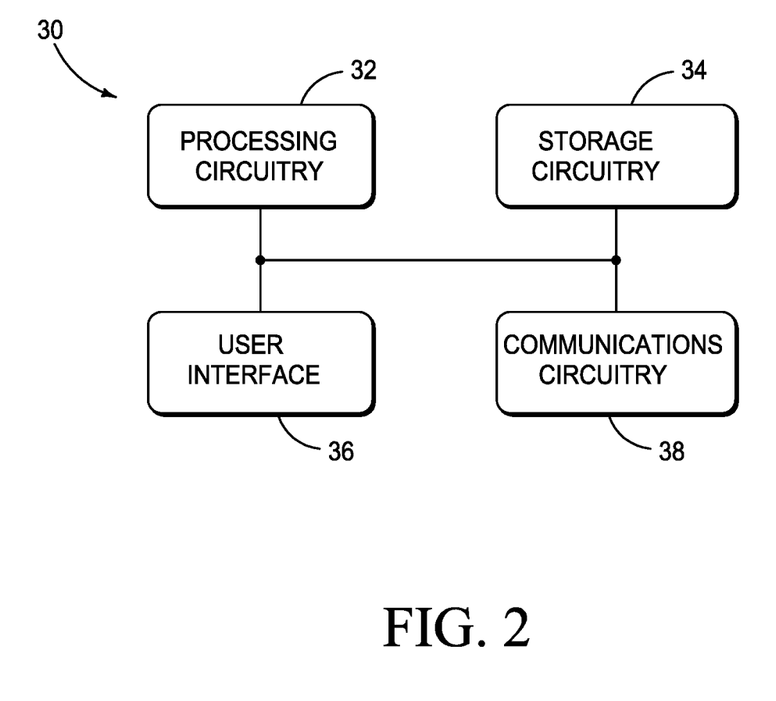
FIG. 2 is a functional block diagram of a management system according to one embodiment.

Referring to FIG. 2, one embodiment of a management system 30 of the aquatic organism monitoring system 10 is shown. Management system 30 is configured to receive data included in the data transmissions from devices 12 that are associated with respective aquatic organisms 16 from one or more receivers 14. In illustrative examples, data within the data transmissions 18 that are emitted from the tracking devices 12 and received by receiver 14 is communicated to the management system 30 to permit monitoring of locations of tagged organisms 16 and storage of the data for later use. Personnel using the management system 30 may monitor the data received by the management system 30 and control operations of the management system 30 and monitoring system 10 responsive to the received data.

In the illustrated example embodiment, management system 30 includes processing circuitry 32, storage circuitry 34, a user interface 36, and communications circuitry 38. Other embodiments of management system 30 are possible including more, less and/or alternative components.

In one embodiment, processing circuitry 32 is arranged to process received data, control data access and storage, control and process interactions with a user, issue commands, and control other desired operations of system 10. Processing circuitry 32 may comprise circuitry (e.g., microprocessor) configured to implement desired programming such as ordered instructions of a program stored upon appropriate computer-readable storage media in at least one embodiment.

Storage circuitry 34 is configured to store programming such as executable code or instructions (e.g., software and/or firmware), data received from tracking devices 12, databases, and other digital information and may include computer-readable storage media, such as memory, a disk drive, etc.

User interface 36 is configured to interact with a user including conveying data to a user (e.g., displaying visual images regarding results of the monitoring of organisms 16 for observation by the user) as well as receiving inputs from the user. User interface 36 is configured as graphical user interface (GUI) in one embodiment and may be configured differently in other embodiments.

Communications circuitry 38 is configured to receive communications from receivers 14 that include data within transmissions 18 from the tracking devices 12 and received by receivers 14. The data is provided to processing circuitry 32 for further processing of the data and monitoring the organisms 16. Communications circuitry 38 may implement wired or wireless communications with the tracking devices 12 in example embodiments.

In some embodiments, the data of the received transmissions 18 is decoded by the processing circuitry 32 to extract data which identifies and tracks the host organisms 16 in up to three dimensions in real-time or as a function of time and may include timestamps which identify the moments in time when the respective data was captured or communicated. The unique codes of transmissions 18 from the tracking devices 12 received by the receivers 14, the locations of the receivers 14 and timestamps indicating the moments in time when the transmissions 18 were received by the receivers 14 may be stored in a database of storage circuitry 34 for subsequent usage.

Figure 3:
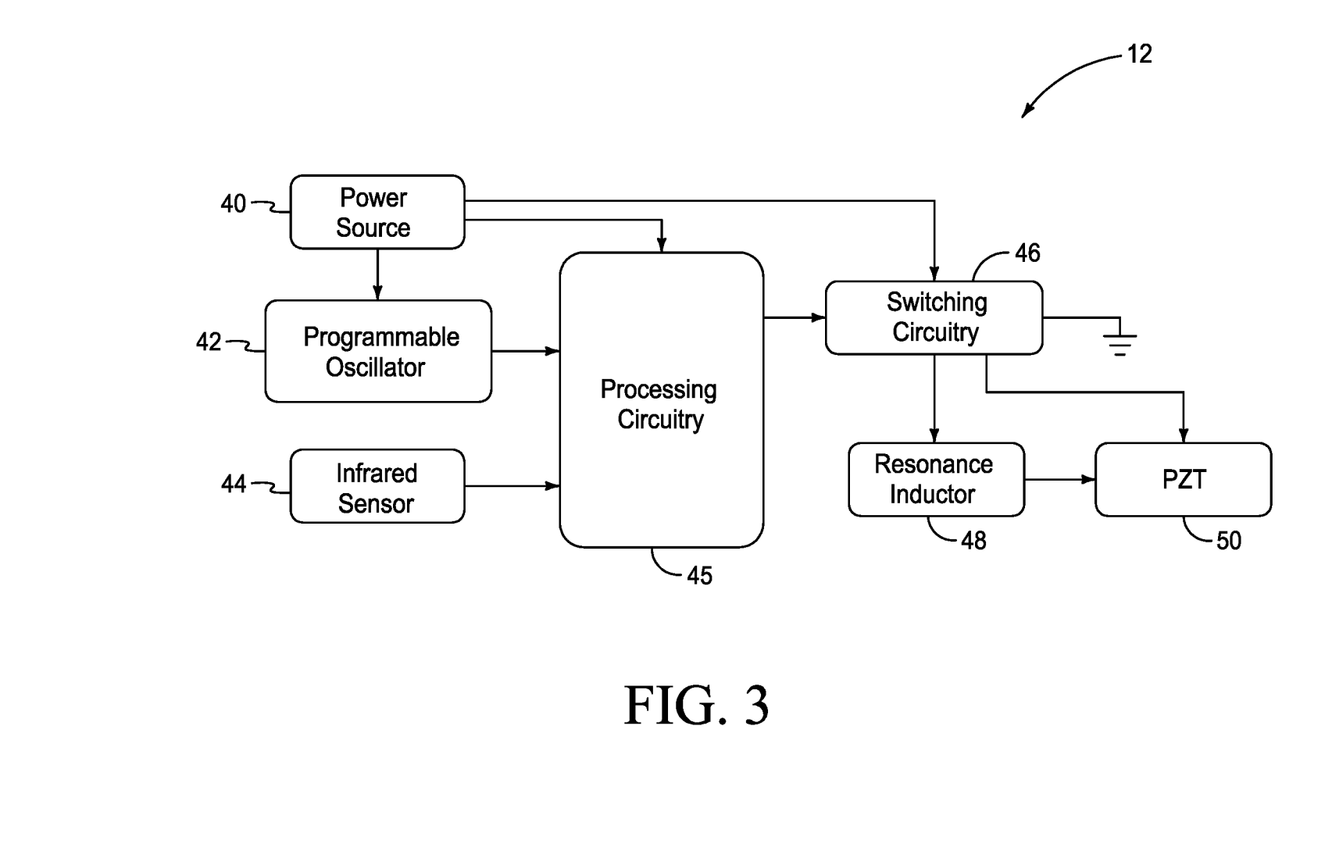
FIG. 3 is a functional block diagram of a tracking device according to one embodiment.

Referring to FIG. 3, a functional block diagram of one embodiment of tracking device 12 is shown according to one embodiment. The illustrated tracking device 12 includes a power source 40, a programmable oscillator 42, an infrared sensor 44, processing circuitry 45, switching circuitry 46, a resonance inductor 48, a transducer 50 and a programmer 52. Other embodiments of tracking device 12 are possible including more, less and/or alternate components.

Power source 40 is configured to store operational electrical energy for use by components of tracking device 12 in the illustrated embodiment. In one embodiment, the power source 24 is in the form of a battery (e.g., 15 mAh Li metal) that is configured to power the entire tracking device 12.

Programmable oscillator 42 produces a customized clock signal for controlling the operation of processing circuitry 45 and permit the tracking device 12 to generate a data transmission 18 that is not limited to a certain operational frequency (e.g., not limited to a certain carrier frequency of a data transmission 18). In one embodiment, programmable oscillator 42 is configured to output a clock signal having a selected one of a plurality of different clock frequencies. In one more specific embodiment, programmable oscillator 42 is implemented as an Epsom SG-8018 programmable oscillator that is programmable to generate a clock signal having a selected frequency less than or equal to 16 MHz in 1 Hz steps. In one implementation, programmable oscillator 42 is programmed to generate a clock signal having a selected frequency prior to association with of the device 12 with a respective organism 16.

Infrared sensor 44 is configured to receive external inputs or commands that configure operations of the tracking device 12, e.g., activating the device 12 from a mode of operation of reduced power consumption, change the pulse rate interval of the data transmissions 18, or change the tag code for the specific tracking device 12.

Processing circuitry 45 is configured to control operations of the tracking device 12 and may be configured similarly to the processing circuitry 32 of the management device 30 described above. In one embodiment, processing circuitry 45 generates control signals that control operations of switching circuitry 46 to control the provision of operational energy from power source 40 to the transducer 50 to generate transmissions 18. In one example, the processing circuitry 45 is implemented as a PIC16LF1823 microcontroller available from Microchip Technology Inc.

Processing circuitry 45 receives the clock signal from the programmable oscillator 42 and executes a plurality of executable instructions of firmware according to the clock signal. As mentioned above, the programmable oscillator 42 may produce clock signals having different frequencies, and accordingly, the speed of execution of the instructions by the processing circuitry 45 may be adjusted by changing the frequency of the clock signal from programmable oscillator 42. In some embodiments, the processing circuitry 45 controls the provision of electrical energy from the power source 40 to the transducer 50 to generate the data transmissions 18 as a result of execution of the executable instructions of the firmware. In a more specific embodiment, the processing circuitry 45 controls the timing of the provision of the electrical energy to the transducer 50 according to the received clock signal to cause the transducer 50 to resonate to generate the data transmissions 18.

As discussed further below, the frequency of the clock signal from programmable oscillator 42 (and the operational speed of the processing circuitry 45) is one example parameter that may be varied to vary the operational frequency of the device 12 as well as vary the carrier frequency of the data transmissions 18. For example, the varying of the frequency of the clock signal varies the timing and frequency that the processing circuitry 45 controls the provision of electrical energy to transducer 50 to generate data transmissions 18 of different carrier frequencies, for example, for use of the tracking devices in systems that use different frequencies for data transmissions 18.

Another example parameter that may be varied to vary the timing and frequency of the application of electrical energy to transducer 50 (and the carrier frequency of data transmissions 18) is the inclusion of a plurality of no operation (NOP) instructions in the firmware executed by the processing circuitry 45. For example, a certain number of NOP instructions may be included in the firmware to reduce the operational frequency of the processing circuitry 45 and device 12, as well as the carrier frequency of the data transmissions 18 by a desired amount corresponding to the number of NOP instructions.

Transducer 50 receives operational energy from power source 40 and switching circuitry 46 and generates data transmissions 18 that are transmitted externally of the device 12 and the body of organism 16 into the water 20. In one embodiment, transducer 50 emits data transmissions responsive to electrical energy received from switching circuitry 46. In one embodiment, transducer 30 is implemented as a piezoelectric transducer that vibrates according to the received operational energy from switching circuitry 46. The vibrations create the data transmissions 18 in the form of acoustic signals which propagate through the water 20 to receiver 14 in one example embodiment.

In one embodiment, a suitable transducer 50 has an outer diameter of 4.3 mm, an inner diameter of 3.7 mm, a length of 3.3 mm, and a weight of 97 mg and that provides a source level of 151.8 dB with an energy consumption of 64 µJ for the data transmissions 18. This example transducer may be implemented as a PZT (lead zirconate titanate) (Navy type-VI) ceramic tube transducer available from TRS Technologies Inc. of State College, Pa. in one embodiment. Transducer 50 operates in a length mode to generate the data transmissions 18 and the terminals of the transducer 50 are located at opposite ends thereof in some of the disclosed embodiments.

A resonance inductor 48 may be coupled between switching circuitry 46 and one terminal of the transducer 50 as shown. Inductor 48 is used to form a resonant LC circuit with transducer 50 in one embodiment. The value of inductor 48 is chosen based on characteristics of transducer 50 and the resonant frequency as well as a given application of use of the tracking device 12. A resistor 49 of 0 Ohms may be utilized in some embodiments for electrical connection to a respective terminal of the transducer 50 using silver epoxy instead of connecting the terminal directly to a circuit board.

Processing circuitry 45 controls the generation of the data transmissions 18 at defined intervals for periodic generation of the data transmissions 18 in one implementation. In one embodiment, the processing circuitry 45 is configured to control emission of the data transmissions 18 at different moments in time which are defined according to a selected one of a plurality of different pulse rate intervals (PRI). In one embodiment, the specific desired interval is selected during the configuration of the tracking device 12. The use of a longer pulse rate interval decreases the rate electrical energy is used from the power source 40 and extends the operational life of the device 12 compared with use of shorter intervals.

As discussed above, some embodiments of the aquatic organism monitoring system 10 are configured to track marine organisms in seawater of the ocean. However, seawater attenuates the transmissions 18 an increased amount compared with fresh water. In some embodiments, tracking devices 12 utilized in seawater are configured to generate transmissions 18 at lower frequencies (~200 kHz or lower) compared with frequencies utilized by tracking devices 12 to track organism in fresh water (e.g., 416.7 kHz). The use of transmissions 18 of lower frequencies according to some of the disclosed embodiments increases the achievable reasonable detection ranges from devices 12 in seawater compared to use of higher frequency transmissions.

Tracking device 12 is configured to generate the data transmissions 18 having a selected one of a plurality of possible different frequencies in one embodiment. In some implementations, the frequencies of clock signals generated by the programmable oscillator 42 and/or the firmware of the processing circuitry 45 may be different to generate the data transmissions 18 having different carrier frequencies. As mentioned above, the clock signal outputted by programmable oscillator 42 can be programmed to different frequencies that are equal or less than 16 MHz. The clock signal having the programmed or selected frequency is applied to and controls timing of operations of processing circuitry 45 as discussed above.

Execution of an individual instruction cycle by processing circuitry 45 is performed over a plurality of clock periods for fetch, decode and execution operations of the instruction cycle. For processing circuitry 45 implemented as a PIC16LF1823 microcontroller, each instruction cycle uses four oscillator (clock) periods and the frequency of each instruction is effectively a quarter of the frequency of the clock signal from programmable oscillator 42.

Processing circuitry 45 turns switching circuitry 46 on and off to selectively alternate the application of electrical energy from the power source 40 to the terminals of transducer 50 so that transducer 50 oscillates with inductor 48 at a resonant frequency to generate the data transmissions 18.

Processing circuitry 45 controls switching circuitry 46 in the form of dual analog switches that selectively apply a voltage from power source 40 to the terminals on either end of the transducer 50 (or connect the terminals to ground).

For example, during half of a carrier cycle of the carrier wave, processing circuitry 45 controls switching circuitry 46 so that electrical energy from power source 40 is applied to inductor 48 and the terminal of transducer 50 coupled with inductor 48 while the other terminal at the other end of the transducer 50 is connected to ground. During the other half of the carrier cycle of the carrier wave, the inductor 48 and the terminal of transducer 50 coupled therewith are connected to ground by switching circuitry 46 while switching circuitry 46 provides electrical energy from power source 40 to the terminal at the other end of transducer 50. The toggling of the terminals of transducer 50 is controlled by the data being encoded (e.g., a unique tag code for the specific tracking device 12). In one embodiment, at least three instruction cycles are required to toggle the terminals of transducer 50 (i.e., two instruction cycles are used to read the data to be encoded and one instruction cycle is used to toggle the transducer terminals).

The frequency of each instruction is f/4 (0<f<=16 MHz) using a PIC16LF1823 microcontroller since each instruction cycle uses four oscillator (clock) periods. Accordingly, the carrier frequencies of the data transmissions 18 generated by the device 12 are f/4n (0<f<=16 MHz, n is any integer greater or equal to 6). If the programmable oscillator 42 is programmed to generate a clock signal of 5 MHz and an integer n of 6 is used, then the carrier frequency of the transmission signal 18 outputted by the tracking device 12 is 208.3 kHz. If the programmable oscillator 42 is programmed to generate a clock signal of 5 MHz and an integer n of 7 is used, then the carrier frequency of the data transmission 19 outputted by the tracking device 12 is 179.6 kHz.

In one embodiment, the frequency of the programmable oscillator 42 selected is calculated based on the desired carrier frequency of the data transmissions. Per the discussion of one embodiment above, the processing circuitry 45 executing firmware utilizes a minimum of six of the instruction cycles to generate the carrier frequency of the data transmissions 18 and each instruction cycle uses four oscillator (clock) periods. Accordingly, the frequency of the clock signal generated by programmable oscillator 42 is programmed to be at least twenty-four times the desired, selected carrier frequency of the data transmissions 18 (i.e., 6*4*carrier f) in one embodiment.

As discussed above, the frequency of the clock signal generated by the programmable oscillator is one parameter that may be varied to vary the operational frequency of the tracking device 12 and carrier frequency of the data transmissions 18. As mentioned above, the programming (e.g., firmware) of the processing circuitry 45 is another parameter that may be varied to vary the frequency of the operational frequency of the tracking device 12 and carrier frequency of the data transmissions 18, for example, by including a selected number of no operation (NOP) instructions to allow additional adjustment of the frequency of the toggling of the transducer 50 controlled by processing circuitry 45 (and adjustment of the carrier frequency of the data transmissions 18). In particular, the transducer 50 is toggled at a slower rate if NOP instructions are included in the firmware compared with execution of firmware that does not include the NOP instructions.

A programmer 52 is utilized to load the firmware into internal storage circuitry of the processing circuitry 45 during manufacture of the device 12 and that may include one or more NOP instructions that may be executed as discussed above. The frequency of the clock signal outputted by programmable oscillator 42 may also be programmed or selected during manufacture of the device 12.

In one more specific embodiment, an individual data transmission 18 from the device 12 includes a total of 31 bits, with 7 synchronization bits (Barker code 1110010 in bits or 72 in hexadecimal format), 16 ID bits (4 hexadecimal digits), and 8 cyclic redundancy check (CRC) bits (2 hexadecimal digits). Each transmitted bit requires ten carrier cycles so one data transmission 18 consists of 310 carrier cycles in one embodiment.

Figure 4:
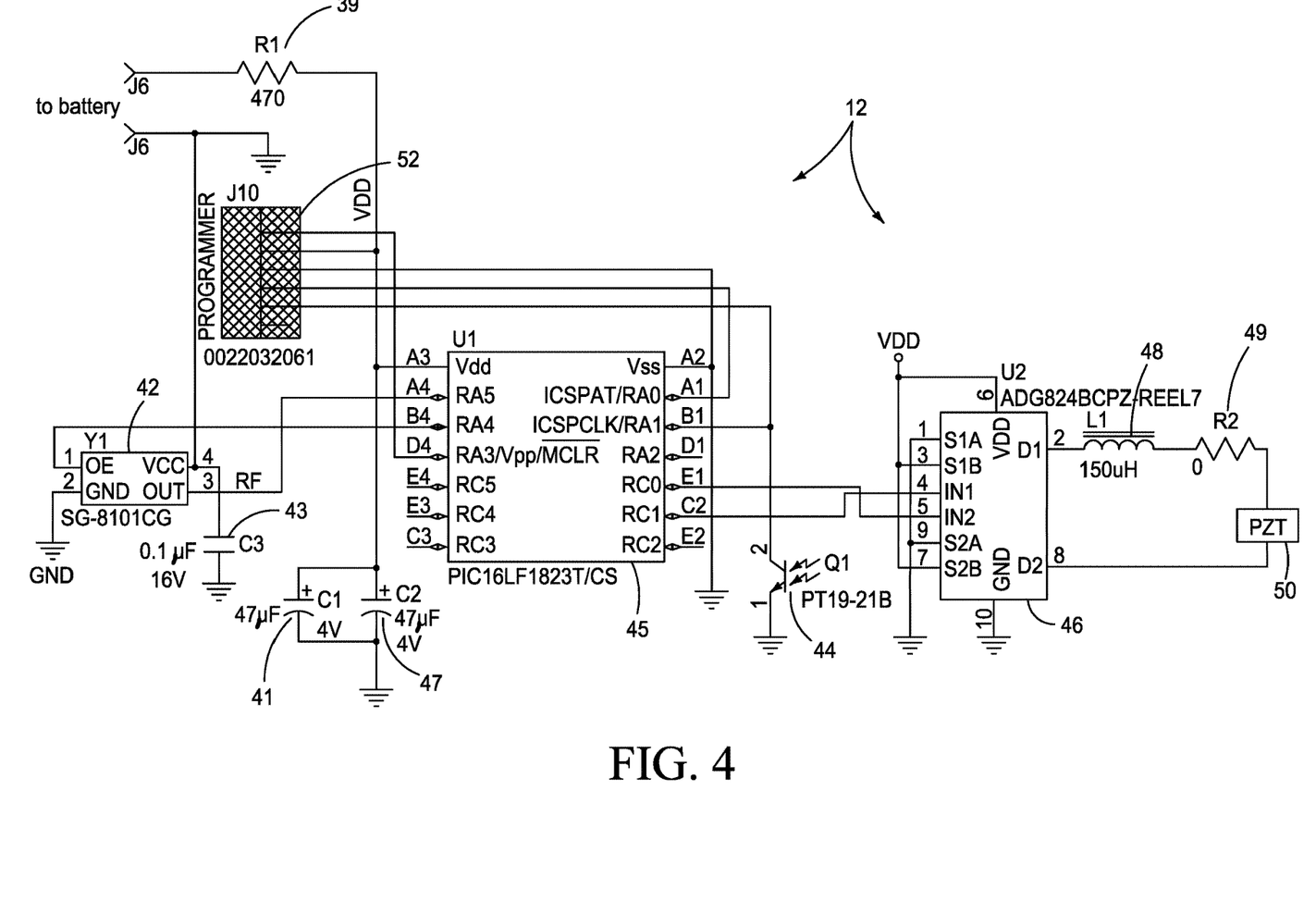
FIG. 4 is a schematic circuit diagram of a tracking device according to one embodiment.

Referring to FIG. 4, a circuit schematic of one embodiment of the tracking device 12 is shown. Example components of the illustrated circuit are shown in Table A.

TABLE A

| Abbr | Component |
| --- | --- |
| R1 | Resistor 470 ohm 0201 |
| C1, C2 | Capacitor tantalum 47 µF |
| L1 | Inductor 150 µH shielded |
| Q1 | Phototransistor black 0603 |
| U1 | PIC16LF1823 microcontroller |
| U2 | Dual analog switch |
| Y1 | Programmable oscillator SG-8018 or similar |
| C3 | Capacitor ceramic 0.1 µF 0201 |

Programmable oscillator 42 and capacitor 43 (0.1 µF capacitor) produce a customized clock signal having a selected one of a plurality of different frequencies for controlling the operation of processing circuitry 45 and permit the device 12 to generate data transmissions 18 having a selectable carrier frequency not limited to a certain frequency. The value of inductor 48 is chosen based on characteristics of transducer 50 and the resonant frequency of transducer 50 and is 150 µH in one embodiment. Resistor 39 is utilized to limit the maximum current that can be discharged from power source 40. The values of the circuit components including inductor 48 and resistor 39 are different in other applications. For applications where a long detection range is of utmost importance, inductor 48 may have a lower inductance (e.g., 68-µH) and be driven at a lower frequency 192.3 kHz. On the other hand, for applications where a long life of the device 12 is desired, the transducer 50 may be operated at 208.3 kHz with a 150-µH inductor.

Figure 5A:
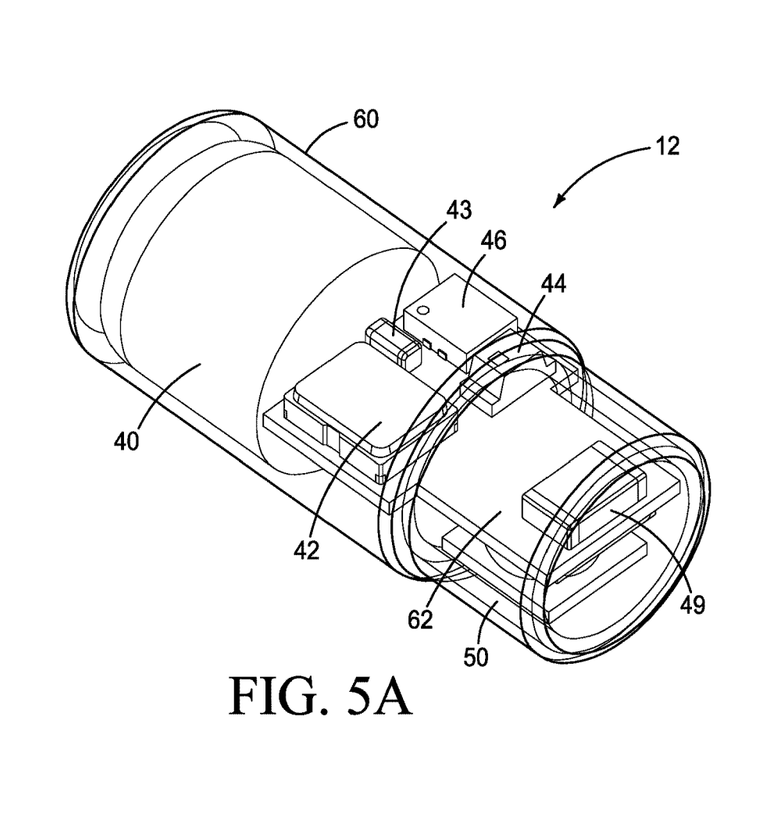
FIGS. 5A and 5B are isometric views of a tracking device according to one embodiment.
Figure 5B:
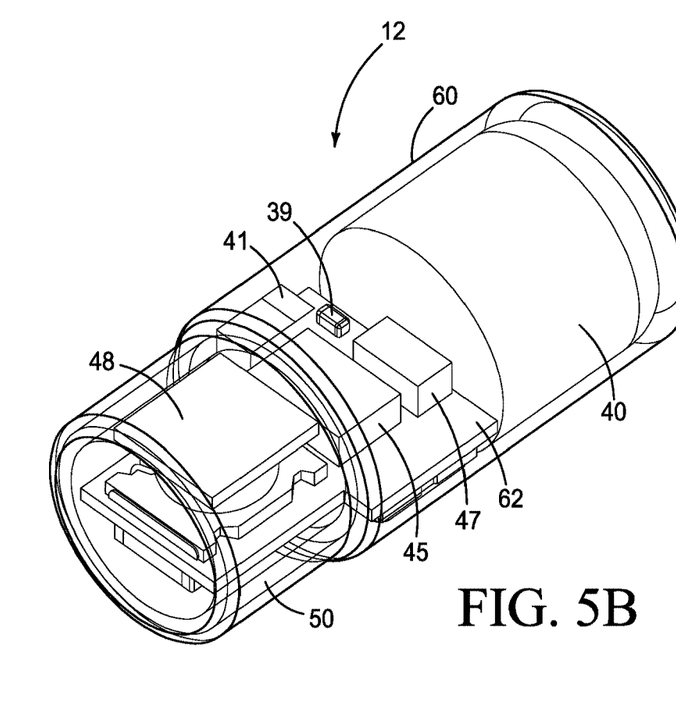

Referring to FIGS. 5A and 5B, one embodiment of a tracking device 12 is shown in a plurality of different views. Internal components and circuitry of the tracking device 12 may be implemented within a body or housing 60 that protects the internal components and circuitry. In one more specific embodiment, the internal components and circuitry are encapsulated within an encapsulating material which forms the housing 60. Example encapsulating materials that may be used include epoxies, such as 3M Scotchcast Electric Resin 5 or EPO-TEK 301.

The depicted embodiment of housing 60 of tracking device 12 has a relatively small profile and diameter, rounded corners, and smooth exterior to facilitate implantation of the device 12 into the body of an organism 16 to be monitored. Other suitable configurations for housing components and circuitry of the tracking device 12 are possible in other embodiments.

Tracking devices 12 that are configured to generate data transmissions 18 at lower frequencies may be larger in size and consume more energy than devices configured to generate data transmissions 18 at higher frequencies. However, the burden of device 12 on the organism should be minimized and some embodiments of the tracking devices 12 described herein have been designed in consideration of size and weight restrictions to provide devices 12 of reduced size and weight and with adequate energy storage capacity for long-term monitoring applications. In one embodiment, housing 60 of tracking device 12 has a diameter of 5.3 mm and length of 11.8 mm and device 12 has a weight of about 400 mg in air.

Utilizing the above-mentioned example transducer, the tracking device 12 emits data transmissions 18 with a source level of 151.8 dB re. 1 µPa (@ 208.3 kHz), an estimated detection range of 240 m in seawater, and a tag life of 140 days. This example tracking device 12 is lighter and generates data transmissions 18 having increased source level and of selectable different carrier frequencies, increased detection range and provides longer operational life compared with existing conventional transmitter arrangements.

In the described example embodiment, transducer 50 defines an internal volume (e.g., the interior volume defined by the ceramic tube) which may be occupied by internal components and/or circuitry of tracking device 12, for example, to reduce the volume and size of the tracking device 12. In the illustrated example, a portion of the circuit board 34 and a plurality of components coupled therewith are provided within the internal volume defined by transducer 30.

Some of the aquatic organism monitoring systems disclosed herein may be utilized to track marine organisms in seawater, for example, for research with respect to MHK devices deployed within the seawater and their impacts to ocean life and environment and effects on habitats. The periodic transmission of the data transmissions 18 according to a selected pulse rate interval enables the presence of the organisms in the vicinity of a receiver to be detected and monitored. According to some embodiments, tracking devices of the monitoring system have reduced weight, increased source level, increased detection range, and longer life compared with conventional tag devices. In some embodiments, the tracking devices 12 are configured to transmit data transmissions 18 at carrier frequencies (e.g., <300 kHz) that are lower than some conventional devices and provide extended range in seawater in marine applications compared with devices that transmit signals at a higher carrier frequency (416.7 kHz).

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An aquatic organism tracking device comprising:
   a housing;
   a transducer coupled with the housing and configured to transmit a data transmission externally of the housing and an aquatic organism associated with the tracking device;
   a programmable oscillator coupled with the housing, and wherein the programmable oscillator is configured to generate a clock signal having a selected one of a plurality of different frequencies;
   processing circuitry coupled with the housing and configured to receive the clock signal from the programmable oscillator and to execute a plurality of executable instructions according to the clock signal;
   a power source coupled with the housing and configured to store electrical energy; and
   wherein the processing circuitry is configured to control the provision of the electrical energy from the power source to the transducer to generate the data transmission as a result of the execution of the instructions.

2. The device of claim 1 wherein the processing circuitry is configured to control timing of the provision of the electrical energy from the power source to the transducer according to the clock signal.

3. The device of claim 1 wherein the processing circuitry is configured to control timing of the provision of the electrical energy from the power source to the transducer to cause the transducer to resonate to generate the data transmission.

4. The device of claim 1 wherein the transducer comprises first and second terminals, and the processing circuitry is configured to alternate the provision of the electrical energy to the first and second terminals of the transducer to generate the data transmission.

5. The device of claim 1 further comprising switching circuitry between the power source and the transducer, and wherein the processing circuitry is configured to control the switching circuitry to control the provision of the electrical energy from the power source to the transducer.

6. The device of claim 5 wherein the switching circuitry is configured to provide the electrical energy to a first terminal of the transducer while coupling a second terminal of the transducer to ground at one moment in time and to provide the electrical energy to the second terminal of the transducer while coupling the first terminal of the transducer to ground at another moment in time.

7. The device of claim 5 further comprising an inductor coupled between the switching circuitry and one of a plurality of terminals of the transducer, and wherein the inductor and the transducer form a resonant LC circuit.

8. The device of claim 1 wherein a plurality of the instructions are no operation (NOP) instructions to control timing of the provision of the electrical energy from the power source to the transducer.

9. The device of claim 1 wherein the data transmission has a carrier frequency of 300 kHz or less.

10. The device of claim 1 further comprising a program interface configured to receive a command from externally of the tracking device that configures the programmable oscillator to generate the clock signal having the selected one of the frequencies.

11. The device of claim 1 wherein the processing circuitry is configured to control the provision of the electrical energy from the power source to the transducer to generate the data transmission having a desired carrier frequency.

12. The device of claim 1 wherein the transducer is configured to generate the data transmission at a selected one of a plurality of carrier frequencies as a result of the generation of the clock signal at the selected one of the different frequencies.

13. The device of claim 1 wherein the transducer is configured to generate data transmissions at a plurality of carrier frequencies as a result of the generation of the clock signal at the different frequencies.

14. The device of claim 1 wherein the transducer is configured to generate the data transmission at a first of a plurality of carrier frequencies as a result of the generation of the clock signal having the selected one of the different frequencies, and wherein the transducer is configured to generate the data transmission at a second of the carrier frequencies as a result of the generation of the clock signal having another of the different frequencies.

15. A method of generating a marine organism tracking signal comprising:
associating a tracking device with an aquatic organism;
using a programmable oscillator of the tracking device, generating a clock signal having a selected one of a plurality of different frequencies;
using processing circuitry of the tracking device, executing a plurality of executable instructions according to the clock signal;
using the processing circuitry, controlling provision of electrical energy from a power source of the tracking device to a transducer of the tracking device as result of the executing; and
using the transducer, emitting a data transmission externally of the tracking device and associated organism as a result of the electrical energy being provided to the transducer.

16. The method of claim 15 wherein the controlling comprises controlling timing of the provision of the electrical energy to the transducer according to the clock signal.

17. The method of claim 15 wherein the controlling comprises controlling timing of the provision of the electrical energy to the transducer to cause the transducer to resonate to generate the data transmission.

18. The method of claim 15 wherein the transducer comprises first and second terminals and the controlling comprises alternating the provision of the electrical energy to the first and second terminals of the transducer to generate the data transmission.

19. The method of claim 15 wherein the controlling comprises controlling switching circuitry to selectively provide the electrical energy to the transducer.

20. The method of claim 15 wherein a plurality of the instructions are no operation (NOP) instructions to control timing of the provision of the electrical energy from the power source to the transducer.

21. The method of claim 15 further comprising receiving a command from externally of the tracking device that configures the programmable oscillator to generate the clock signal having the selected one of the frequencies.

22. The method of claim 15 wherein the processing circuitry is configured to control the provision of the electrical energy from the power source to the transducer to generate the data transmission having a desired carrier frequency.

23. The method of claim 15 wherein the data transmission has a carrier frequency of 300 kHz or less.

24. The method of claim 15 further comprising selecting the one of the different frequencies to control the emission of the data transmission at a corresponding one of a plurality of different carrier frequencies.

* * * * *